United States Patent
Sarshar et al.

(10) Patent No.: US 11,948,248 B2
(45) Date of Patent: Apr. 2, 2024

(54) THREE-DIMENSIONAL (3D) MODEL GENERATION FROM TWO-DIMENSIONAL (2D) IMAGES

(71) Applicant: NexTech AR Solutions Inc., Toronto (CA)

(72) Inventors: Nima Sarshar, Miami, FL (US); Max Hwang, Hayward, CA (US)

(73) Assignee: NexTech AR Solutions Corp., Toronto (CA)

( * ) Notice: Subject to any disclaimer, the term of this patent is extended or adjusted under 35 U.S.C. 154(b) by 61 days.

(21) Appl. No.: 17/874,992

(22) Filed: Jul. 27, 2022

(65) Prior Publication Data

US 2024/0037851 A1  Feb. 1, 2024

(51) Int. Cl.
*G06T 17/10* (2006.01)
*G06T 17/20* (2006.01)
*G06T 19/00* (2011.01)

(52) U.S. Cl.
CPC ............ *G06T 17/10* (2013.01); *G06T 17/20* (2013.01); *G06T 19/00* (2013.01); *G06T 2200/04* (2013.01); *G06T 2200/08* (2013.01); *G06T 2210/04* (2013.01); *G06T 2219/2004* (2013.01); *G06T 2219/2021* (2013.01)

(58) Field of Classification Search
None
See application file for complete search history.

(56) References Cited

U.S. PATENT DOCUMENTS

| | | | | |
|---|---|---|---|---|
| 11,275,870 | B2 * | 3/2022 | Diguet | G06F 30/00 |
| 2009/0144042 | A1 * | 6/2009 | Lorenz | G06F 30/17 |
| | | | | 703/14 |
| 2012/0303334 | A1 * | 11/2012 | Storms | G06F 30/17 |
| | | | | 703/1 |
| 2016/0284122 | A1 * | 9/2016 | Tatourian | G06T 19/00 |
| 2019/0122027 | A1 * | 4/2019 | Prideaux-Ghee | G06T 7/248 |
| 2020/0342207 | A1 * | 10/2020 | Raczkowski | G06V 40/70 |
| 2021/0232120 | A1 * | 7/2021 | Marinov | G06T 17/30 |
| 2021/0390767 | A1 * | 12/2021 | Johnson | G06V 40/176 |
| 2022/0343522 | A1 * | 10/2022 | Bi | G06T 17/20 |
| 2023/0330939 | A1 * | 10/2023 | Sugishita | B22F 10/80 |

FOREIGN PATENT DOCUMENTS

WO   WO-2019079907 A1 *  5/2019 ......... G06K 9/00288

* cited by examiner

*Primary Examiner* — Jwalant Amin
(74) *Attorney, Agent, or Firm* — Fenwick & West LLP

(57) ABSTRACT

A model generation system generates three-dimensional object models based on two-dimensional images of an object. The model generation system can apply an iterative gradient decent process to model parameters for part models within an object model to compute a final set of model parameter values to generate the object model. To compute the final set of model parameter values, the model generation generates a reference image of the object model and compares the reference image to a received image. The model generation system uses a differentiable error function to score the reference image based on a received image. The model generation system updates the set of model parameter values based on the score for the reference image, and iteratively repeats the process until a reference image is sufficiently similar to the received image.

20 Claims, 6 Drawing Sheets

THREE-DIMENSIONAL (3D) MODEL GENERATION FROM TWO-DIMENSIONAL (2D) IMAGES

BACKGROUND

Computing devices can display three-dimensional (3D) objects to a user through a digital 3D object model. These 3D object models may generally represent the structure of the object through the use of a meshes that is made up of a set of tessellations. There is a growing demand for 3D object models of real-life objects. For example, virtual reality and artificial reality systems generally use 3D object models to display virtual objects to users. Similarly, websites may use 3D object models to display objects that are available on those sites in a manner that allows a user to get a better sense of what the object looks like in 3D.

Conventional techniques for generating these meshes, however, is expensive and time consuming. Conventional techniques require a human to manually draw the 3D model of the object in a computer program. Some systems use depth sensors or laser scanners to generate a 3D model of an object by capturing data describing the object's structure from multiple angles. The equipment required to perform these scans, however, is expensive to purchase and use, and still requires a significant amount of time for each scan.

SUMMARY

A model generation system generates three-dimensional object models based on two-dimensional images of an object. An object model may be made up of a set of part models. The part models have model parameters that determine the structure of the part models. The model generation system can apply an iterative gradient decent process to these model parameters to compute a final set of model parameter values to generate a final three-dimensional object model for the object.

To compute the final set of model parameter values, the model generation generates a reference image of the object model (e.g., by rendering the object model from a camera perspective) and compares the reference image to a received image. The model generation system uses a differentiable error function to score the reference image based on a received image. The model generation system updates the set of model parameter values based on the score for the reference image, and iteratively repeats the process until a reference image is sufficiently similar to the received image. The model generation can generate an object model based on the final set of model parameter values and store the object model on a computer-readable medium.

The differentiable error function is a function that scores a set of model parameter values based on how similar the reference image is to the received image. The differentiable error function is generated based on the set of model parameters and a set of constraints on the set of model parameters. The set of constraints represent relationships between the model parameters that reduce the number of free variables in the set of model parameters. For example, a constraint that a chair back part model must be the same width as a chair seat part model means that the model parameters that set of widths of those models must be the same, and therefore a free variable is eliminated. Thus, the differentiable error function can be used to perform gradient decent more efficiently because free variables are removed from the gradient decent process.

The model generation system thereby improves on conventional model generation technologies by reusing previously generated part models for a new part corresponding to an object, thereby allowing high-quality 3D models to be generated more easily. Additionally, by using the constraints on the model parameters that reduce the number of free variables, the gradient decent process can be performed more efficiently.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example System Overview

Figure 1:
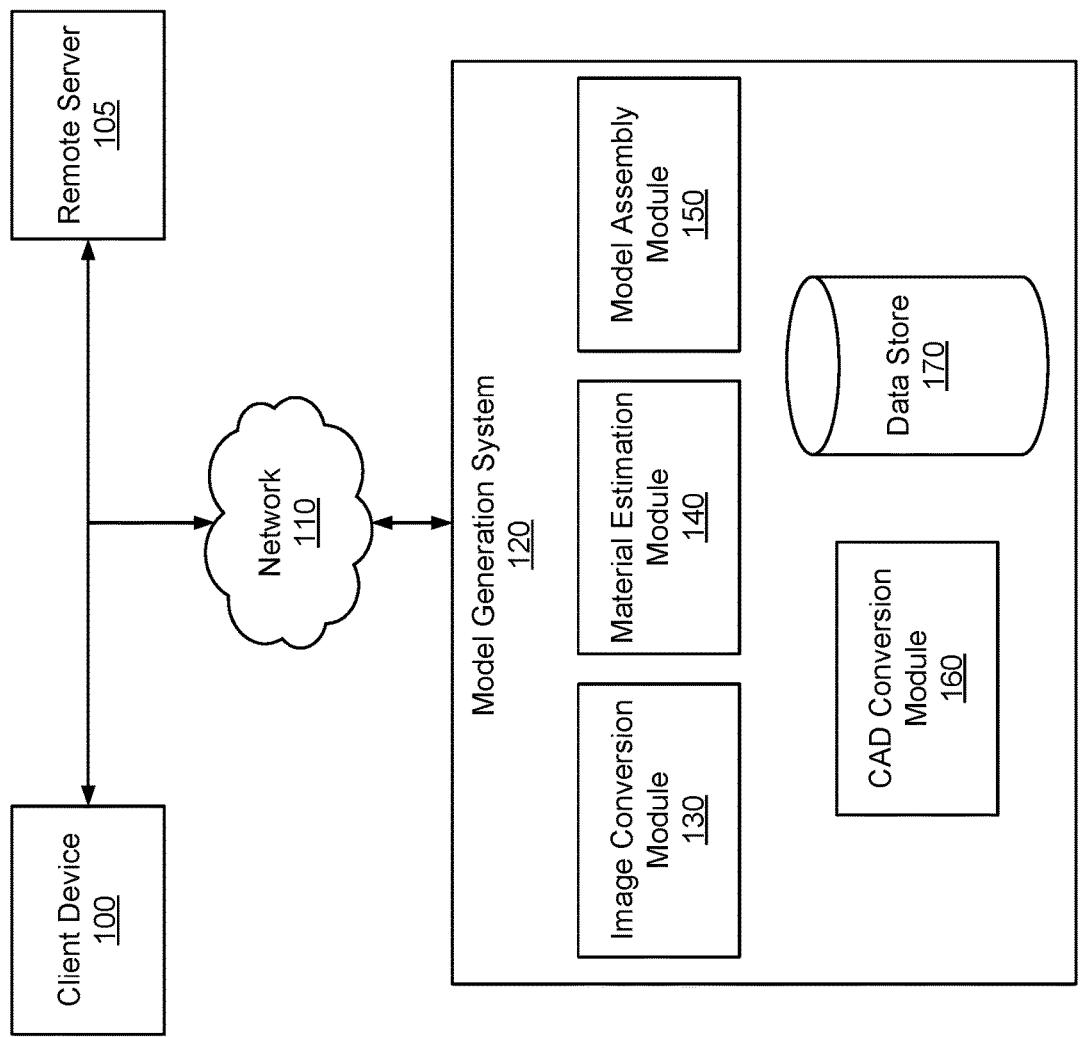
FIG. 1 illustrates an example system environment for a model generation system 120, in accordance with some embodiments.

FIG. 1 illustrates an example system environment for a model generation system 120, in accordance with some embodiments. The system environment illustrated in FIG. 1 includes one or more client devices 100, one or more remote servers 105, a network 110, and the model generation system 120. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

A user may interact with the model generation system 120 through a client device 100. The client device 100 can be a personal or mobile computing device, such as a smartphone, a tablet, a laptop computer, or desktop computer. In some embodiments, the client device 100 executes a client application that uses an application programming interface (API) to communicate with the online system 120 through the network 110.

The client device 100 may transmit image data of an object to the model generation system 120. The image data may include a two-dimensional (2D) object image that depicts an object in two-dimensional color pixel values. For example, a 2D object image may include a two-dimensional array of RGB values that depict the object. The client device 100 also may receive from the model generation system 120 a three-dimensional (3D) object model depicting an object. For example, the client device 100 may receive a 3D object model generated based on a 2D object image provided by the client device 100 or may receive a 3D object model requested by the user through the client device 100. In some embodiments, the client device 100 receives the 3D object model in an OBJ or a glTF file. The client device 100 may include a display by which the client device 100 can display a 3D object model to a user.

A remote server 105 may communicate with the model generation system 120 to generate 3D object models for 2D object images stored by the remote server 105. For example, the remote server 105 may store many 2D object images and the operator of the remote server 105 may want the model generation system 120 to generate 3D object models for the 2D object images. The remote server 105 may transmit 2D object images to the model generation system 120 and may receive 3D object models from the model generation system 120. In some embodiments, the remote server 105 provides 2D object images for objects available for sale on a website provided by the remote server 105.

The client device 100 and remote server 105 may communicate with the model generation system 120 via the network 110. The network 110 may comprise any combination of local area and wide area networks employing wired or wireless communication links. In some embodiments, the network 110 uses standard communications technologies and protocols. For example, the network 110 includes communication links using technologies such as Ethernet, 802.11, worldwide interoperability for microwave access (WiMAX), generational networks (e.g., 4G, 5G, 6G), code division multiple access (CDMA), digital subscriber line (DSL), etc. Examples of networking protocols used for communicating via the network 110 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 110 may be represented using any format, such as hypertext markup language (HTML) or extensible markup language (XML). In some embodiments, all or some of the communication links of the network 110 may be encrypted.

Figure 6:
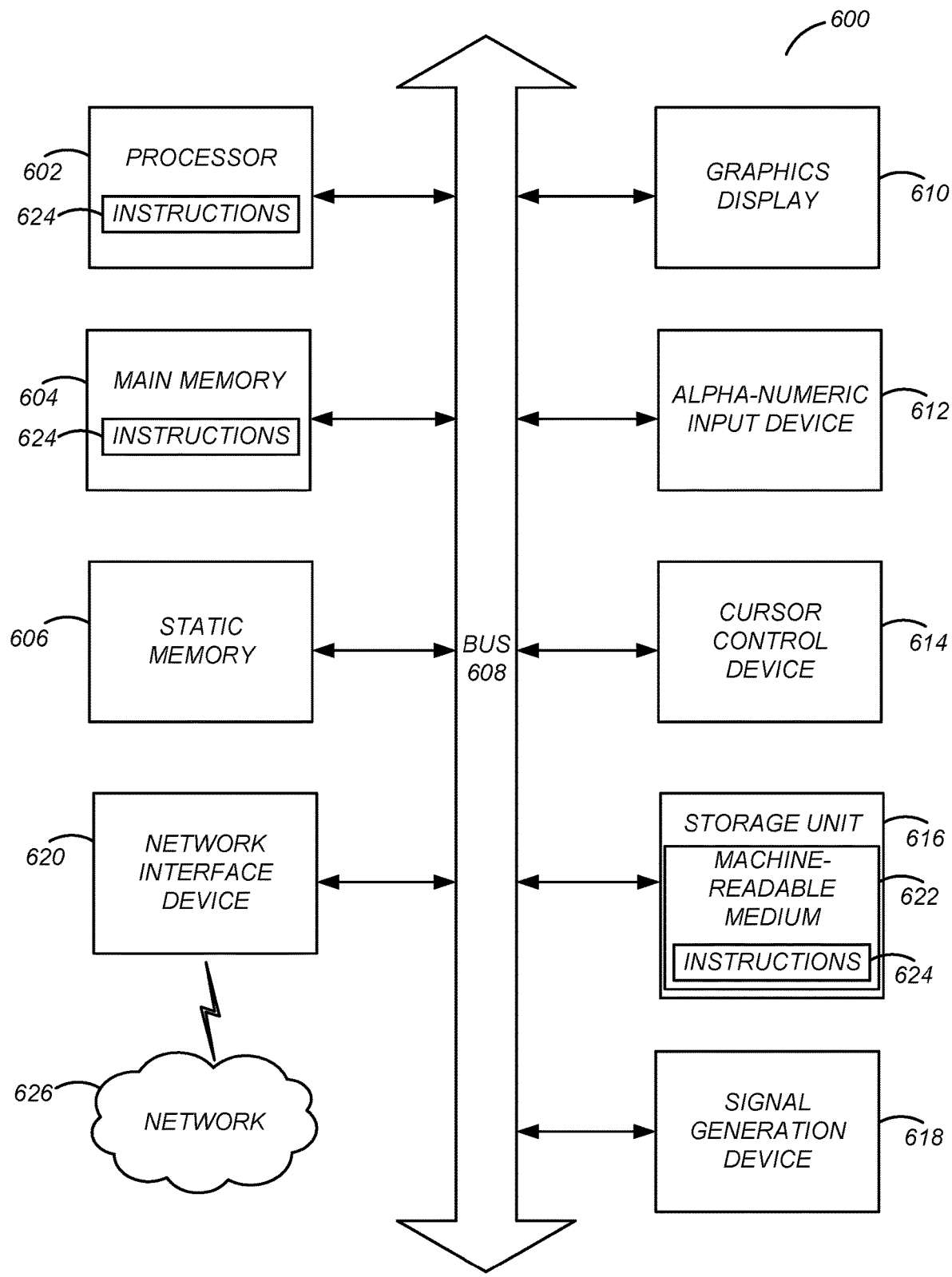
FIG. 6 is a block diagram illustrating components of an example machine able to read instructions from a machine-readable medium and execute them in a processor (or controller), in accordance with some embodiments.

FIG. 1 also illustrates an example system architecture of a model generation system 120, in accordance with some embodiments. The model generation system 120 illustrated in FIG. 1 includes an image conversion module 130, a material estimation module 140, a model assembly module 150, a CAD conversion module 160, and a data store 170. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention. In addition, a module may be hardware based, e.g., a processor and a non-transitory memory, and/or software (e.g., program code comprised of instructions) based. For example, the module may be a software program (e.g., computer code comprised of instructions) stored in the memory that when executed by the processor performs the described functionality. FIG. 6 provides an example computing system. Some or all of the hardware and/or software components described with FIG. 6 may be used for operation and/or execution of the functions described with the components if FIG. 1.

The image conversion module 130 receives object images from the client device 100, the remote server 105, or the data store 170 and generates a 3D object model for the object based on the object image. The image conversion module 130 may generate an object skeleton for the object based on the object image. The image conversion module 130 may use the object skeleton to generate pixel partitions representing parallel cross sections of the object. The image conversion module 130 may apply a machine-learning model (e.g., a neural network) to the object image to determine parameters for a shape that would best represent each parallel cross section and then generate the 3D object model for the object based on the shapes of each cross section, the object image, and the object skeleton.

The material estimation module 140 generates texture maps for a texture based on a material image. A material image is an image of a physical material that describes the color (e.g., via an RGB color system) of the physical material. The material estimation module 140 may identify a material class for the physical material depicted in the material image by applying a machine-learning model to the material image. The material estimation module 140 may then identify a texture map model that generates texture maps for the physical material based on the material image. The texture map model is a machine-learning model that is trained to generate texture maps for material images of a particular material class. The texture maps generated by the texture map model may include texture maps of standard texture values, such as metalness and roughness.

The model assembly module 150 assembles a 3D object model for an object based on part models for parts that make up the object. The model assembly module 150 may receive an object image and identify the parts of the object based on the object image. The model assembly module 150 may then determine whether the model generation system 120 has stored a part model that would correspond to the identified part. The model assembly module 150 may compare the portion of the object image that corresponds to the part to model images of a set of part models. The model images are images of part models that are rendered based on different camera views of the part models. The model assembly module 150 may identify a part model that best corresponds to the identified part based on similarity scores of the model images associated with the part model and the portion of the object image associated with the identified part. The model assembly module 150 may perform this process for each part of the object and then assemble an object model based on the part models for each part of the object.

The model assembly module 150 further generates object models by applying a gradient decent process to model parameters for part models that make up an object model. The model assembly module 150 applies a differentiable error function to reference images rendered based on a set of model parameter values for the object model to score the reference images for how similar the reference images are to a received image. The model assembly module 150 performs a gradient decent process to update the set of model parameter values, and may continue to iterate this process until a generated reference image is sufficiently similar to the received image. The gradient decent process is described in further detail below.

The CAD conversion module 160 generates a 3D object model based on CAD data describing an object. The CAD data received by the CAD conversion module 160 may contain a set of surfaces for the object. Each surface may be described by a parameterized surface equation that describes the shape of the surface in a 3D space. The CAD conversion module 160 may extract those surface equations from the CAD data and generate field lines and equipotential lines for each surface. The field lines may be lines that are tangent to the gradient vector field of the surface, and the equipotential lines may be lines along the surface that designate points that have the same potential within the gradient field vector. The CAD conversion module 160 may use the field lines and the equipotential lines to generate quadrangular tessellations for a 3D object model for the object described by the CAD data. FIG. 8 and its corresponding description explains more details on generating 3D models based on CAD data, in accordance with some embodiments.

The data store 170 stores data used by the model generation system 120 to generate 3D models. For example, the data store 170 may store machine-learning models used by the model generation system 120 or may store the 3D models generated by the model generation system. Additionally, the data store 170 may store image data of objects that the model generation system uses to generate 3D models. In some embodiments, the data store 170 stores texture maps and material images used by the model generation system 120 to generate texture maps. Additionally, the data store 170 may store part models for parts of objects.

Example Model Assembly

Figure 2:
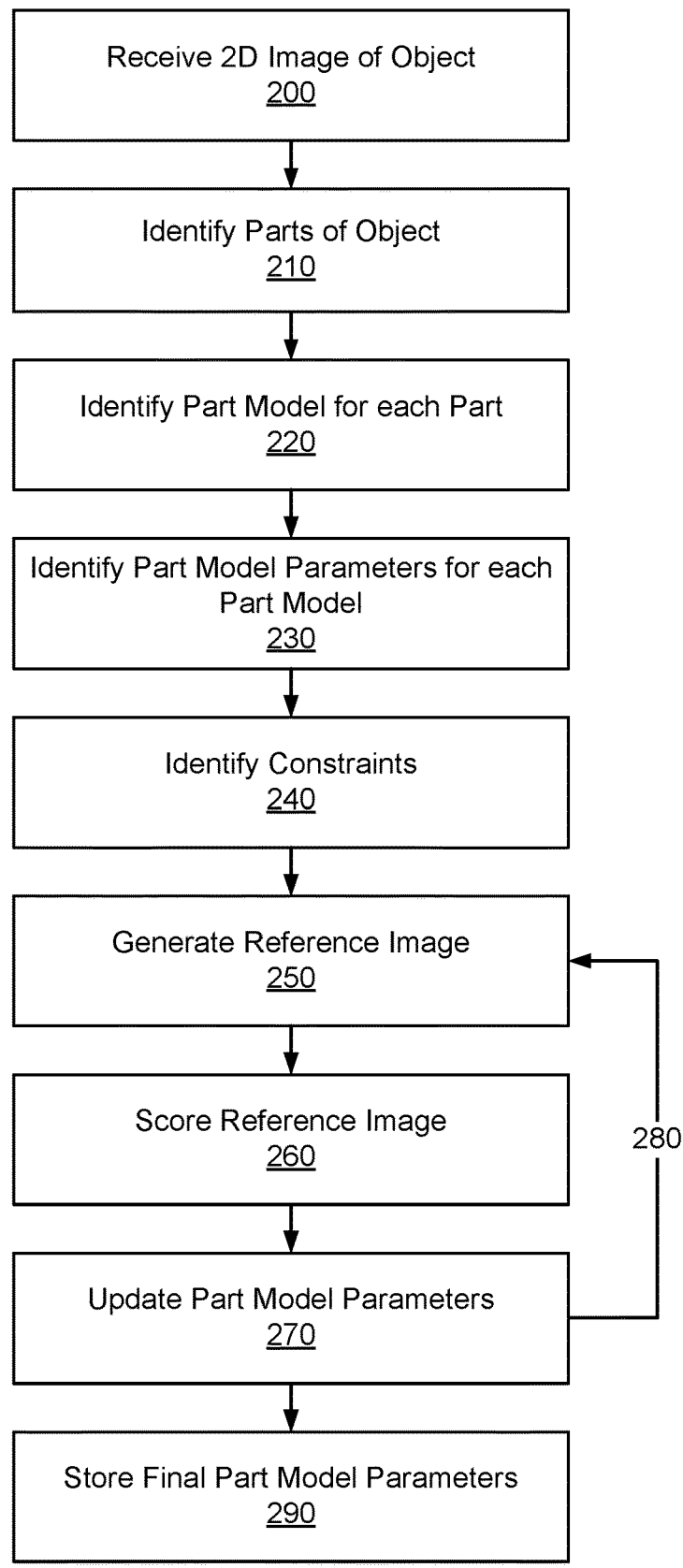
FIG. 2 is a flowchart for a method of assembling an object model based on a set of part models, in accordance with some embodiments.

FIG. 2 is a flowchart for a method of assembling an object model based on a set of part models, in accordance with some embodiments. Alternative embodiments may include more, fewer, or different steps from those illustrated in FIG. 2, and the steps may be performed in a different order from that illustrated in FIG. 2. Additionally, each of these steps may be performed automatically by the model generation system without human intervention. The method depicted in FIG. 2 may be performed by the model assembly module 150, or by some other component of the model generation system 120. It is noted that some or all of the hardware and/or software components described with FIG. 6 may be used for operation and/or execution of the process described with FIG. 2. In addition, the process of FIG. 2 may be further described with reference to FIGS. 3, 4A, 4B and 5.

The model assembly module 150 receives 200 a 2D image of an object and identifies 210 the object parts of the object. For example, the model assembly module 150 may apply a semantic segmentation process to the object image to identify the object parts that make up the object. An object part is a defined part of an object. For example, a chair object may have a "back" part and four "leg" parts. The model assembly module 150 may associate each object type with a set of part types. For example, "chair" type objects may be associated with a "back" part type, a "seat" part type, and four "leg" part types. Similarly, a "lamp" type object may be associated with a "shade" part type, a "shaft" part type, and a "base" part type.

Figure 3:
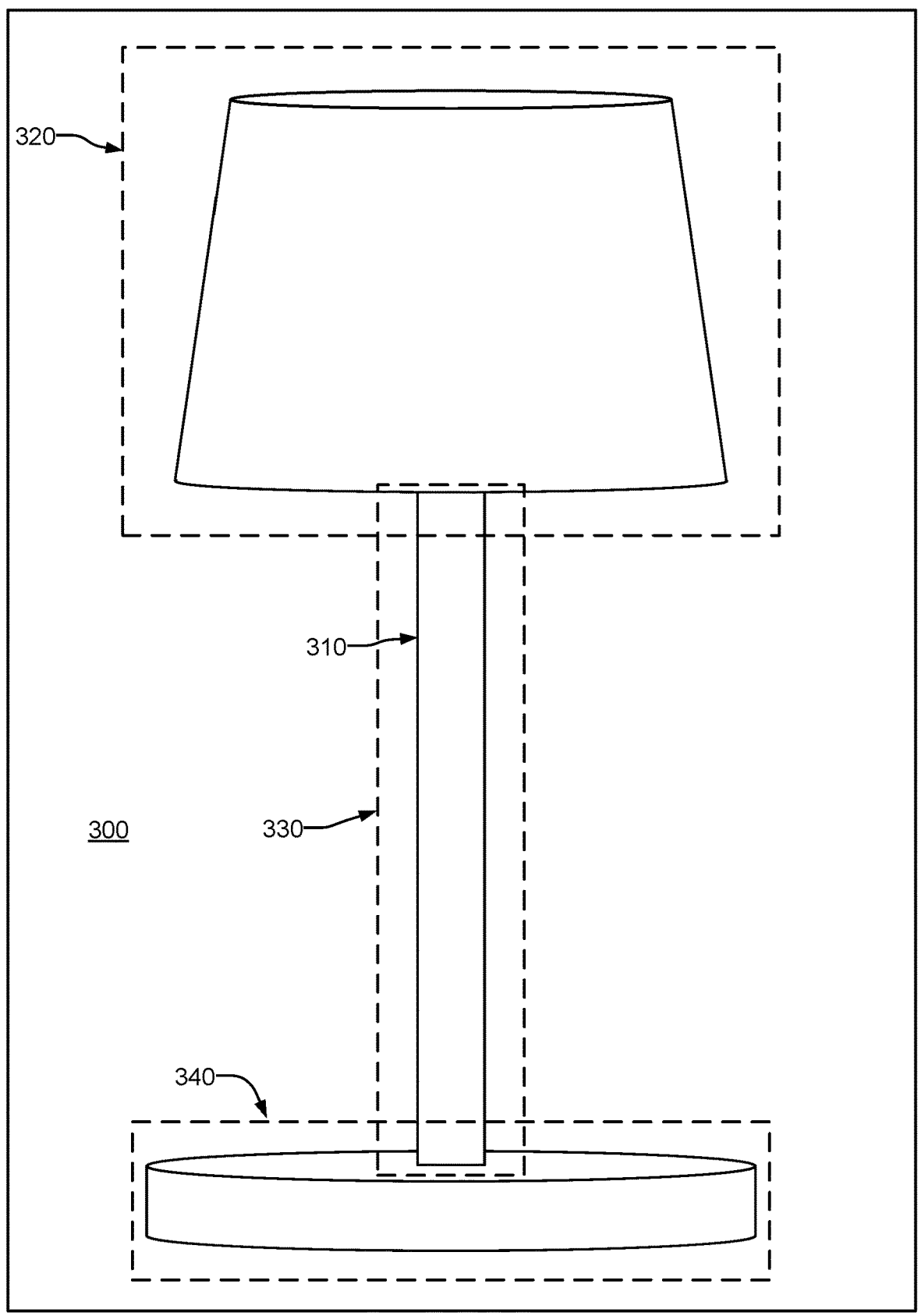
FIG. 3 illustrates an example object image that has been partitioned into separate parts, in accordance with some embodiments.

FIG. 3 illustrates an example object image 300 that has been partitioned into separate parts, in accordance with some embodiments. The object image 300 illustrated in FIG. 3 is of a lamp 310. The object itself may be pre-analyzed to classify the type of object. For example, the image may be analyzed to determine that this particular object is a lamp. Once the object is identified as a lamp, here, lamp 310, the model assembly module 150 may determine the parts that correspond to a lamp based on the matched classification and identify its parts as a lamp shade part 320, a lamp shaft part 330, and a lamp base part 340.

The model assembly module 150 identifies 220 a part model for each identified object part. A part model is a 3D model of an object part. An object part may have more than one part model that can represent that object part type. For example, the model assembly module 150 may store multiple part models for chair legs so that different chair leg part models can be used to represent different styles of chair legs. Each part model includes a set of three-dimensional shapes that make up the part model. For example, a lamp shaft part model may simply include a rectangular prism or a cylinder, whereas a lamp shade part model may include a set of triangular prisms arranged to represent a frilled lamp shade.

The model assembly module identifies model parameters 230 for each part model. Each part model includes a set of model parameters for determining the structure of a part model. The model parameters may include internal model parameters. Internal model parameters are model parameters that set the structure of shapes in the part model. For example, where a part model simply comprises a rectangular prism, the internal model parameters for the part model may be the length, width, and height of the rectangular prism. Similarly, where a part model comprises a cylinder, the internal model parameters for the part model may be the radius and height of the cylinder. In some embodiments, the internal model parameters for the part model include internal shape parameters for each shape that makes up the part model. The internal shape parameters set the structure for a shape that makes up a part model. For example, a chair back part model may be constructed based on multiple shapes (e.g., a shape for a top portion of the back and shapes for struts that connect the top portion to a seat), and the internal model parameters for that part model may include internal shape parameters for each of those shapes.

In some embodiments, the set of model parameters for a part model include deformation parameters for shapes. Deformations are functions that adjust the structure of a shape to transform the shape into a different shape. For example, a cylinder may be deformed into a cone by applying a deformation function that changes the radius of the cylinder at different heights. The deformation parameters are parameters that adjust the deformation to a shape. Using the cylinder example, deformation parameters may set a slope of the cone to form from the cylinder, or may establish a top and bottom radius for the cylinder to generate a truncated cone.

Additionally, the set of part model parameters may include external model parameters. External model parameters are parameters that set the position and orientation of the part model. For example, the external model parameters may include an X, Y, and Z position of the part model and may include a θ, φ, and φ dimension for the part model, though alternative coordinate systems may use different parameters to represent the position and orientation of a 3D model. The external model parameters for the part model may be set relative to a reference or origin point for the object model.

Similar to the internal model parameters, the external model parameters may include external shape parameters that set the position and orientation of the shapes that make up the part model. The external shape parameters may be set relative to the same reference or origin point that is used for the external model parameters for the part model as a whole, or may be set relative to a reference or origin point that is used for the part model only.

Figure 4A:
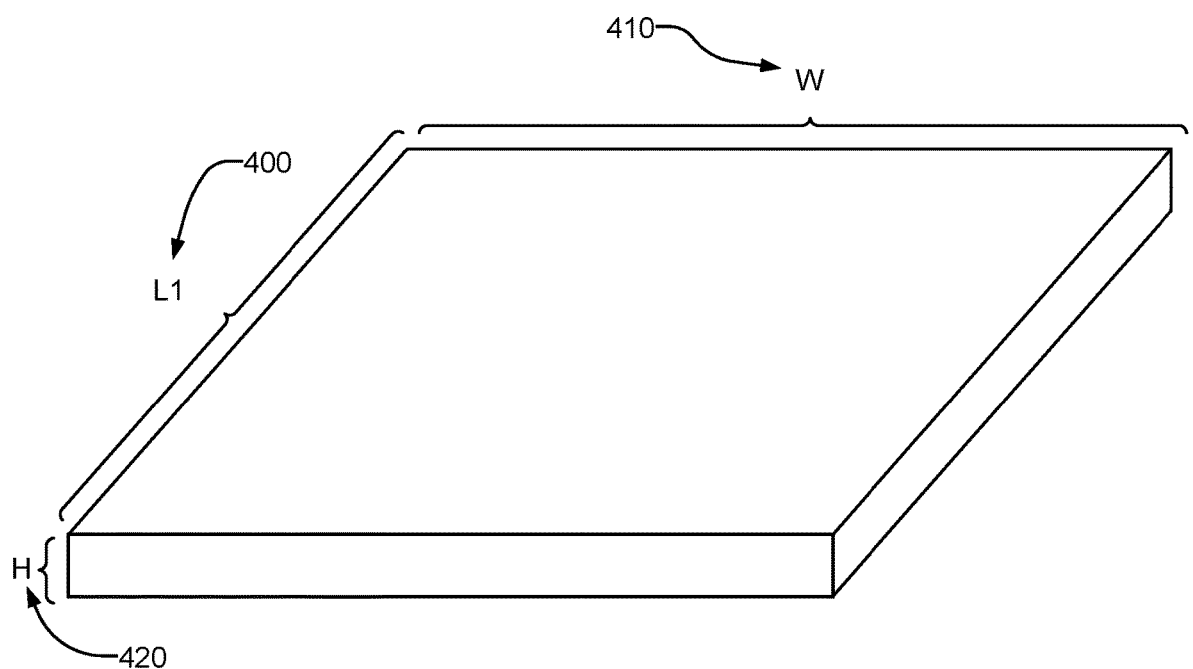
FIGS. 4A and 4B illustrate example part models with model parameters, in accordance with some embodiments.
Figure 4B:
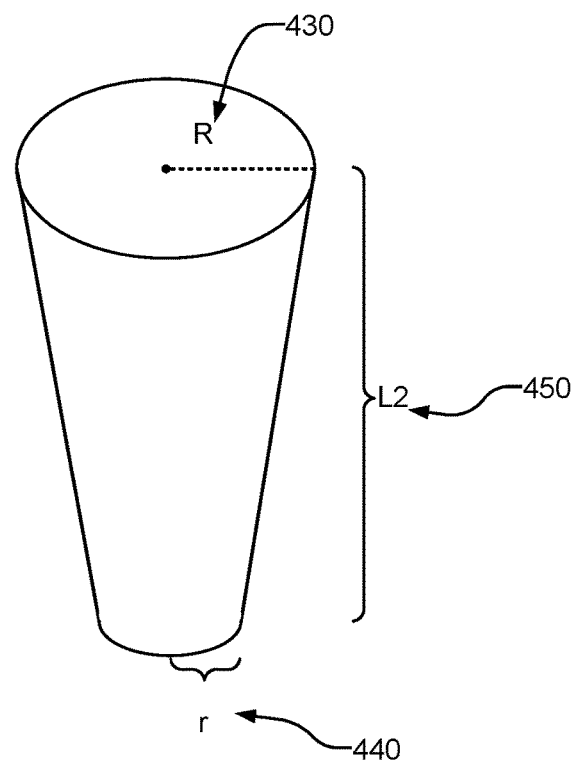

FIGS. 4A and 4B illustrate example part models with model parameters, in accordance with some embodiments. FIG. 4A illustrates an example part model for a tabletop part for a table object. The illustrated tabletop part model has three model parameters: a length parameter 400, a width parameter 410 and a height parameter 420, though the tabletop part model may also include model parameters that indicate the position of the tabletop within the object.

FIG. 4B illustrates an example table leg part for a table object. The illustrated table leg part has three model parameters: a top radius 430, a bottom radius 440, and a length 450, though the table leg part may also include model parameters that indicate the position of the tabletop within the object.

The model assembly module 150 identifies a part model by determining which part model most closely fits the identified object part in the 2D image. In some embodiments, the model assembly module 150 identifies a part model for the object part by identifying an object type for the object. For example, if the object image is an image of a chair, the model assembly module 150 may classify the object image as a chair. Using this classification, the model assembly module 150 may identify part types for each object part that correspond to the object type and then identify the part models that best fit the identified object parts that correspond to their respective part types. U.S. patent application Ser. No. 17/707,917, entitled "Three-Dimensional (3D) Model Assembly" and filed Mar. 29, 2021, the contents of which are incorporated by reference in their entirety, describes example methods for identifying part models and assembling parts into an object model.

The model assembly module 150 computes a set of values for the model parameters for each part model to be used to generate an object model based on the part models. To compute the model parameter values, the model assembly module 150 identifies 240 constraints on the model parameters for the part models that make up the object model. Constraints are relationships between different model parameters that reduce the number of free variables in setting the model parameters. These constraints may be equations that establish the relationships between model parameters. For example, a constraint on model parameters $p_1$ and $p_2$ may be that $p_1 = 3p_2$. Similarly, a constraint on model parameters $p_3$, $p_4$, and $p_5$ may be $p_3 = 2p_4 + 6p_5$.

These constraints may be established in an assembly graph. An assembly graph is a set of instructions that indicate how part models are assembled into an object model. The assembly graph may contain constraints on how model parameters of different part models relate to each other. The assembly graph includes constraints on the model parameters of one part model based on the model parameters of another part model. For example, an assembly graph may constrain the position, orientation, and width of leg part models for a chair based on the dimensions and orientation of a seat part model for the chair.

Constraints also may be established within part models. A part model may constrain the shape parameters for one shape based on the shape parameters for a different shape. For example, a part model may constrain the shape parameters for an ornamental shape on a chair leg part model such that it is located at a certain relative position on the chair leg and that it is a similar size to the width of the rest of the chair leg.

Figure 5:
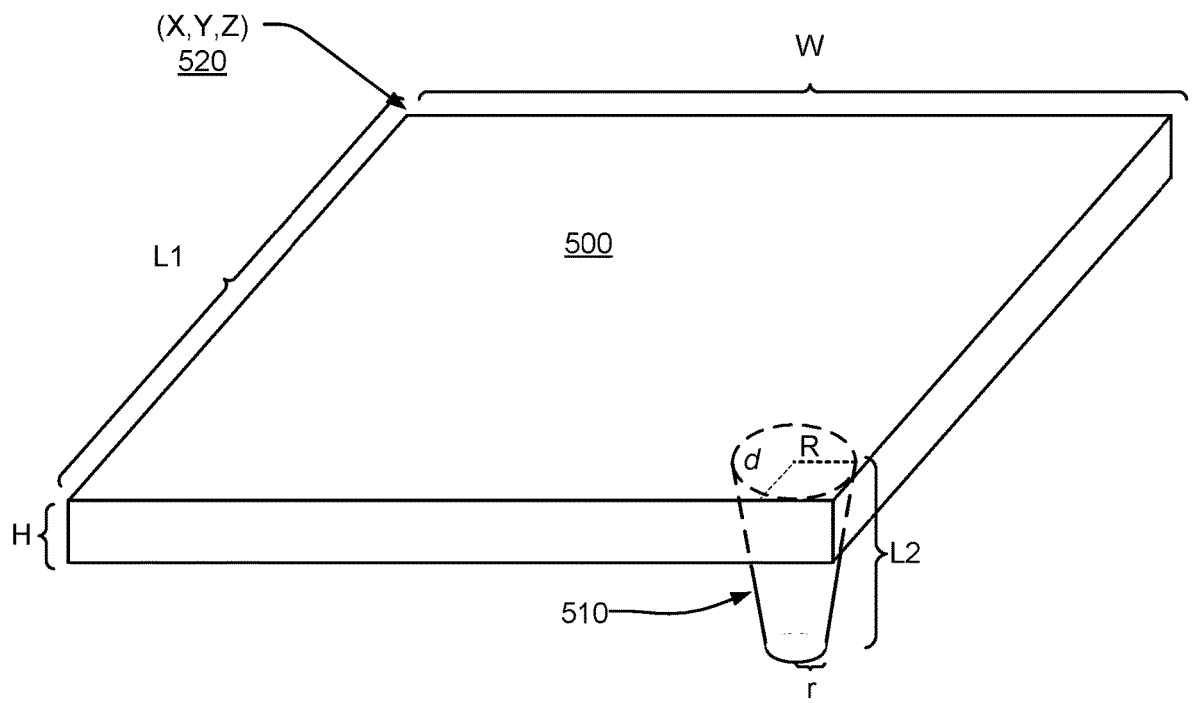
FIG. 5 illustrates constraints on model parameters for part models within an object model, in accordance with some embodiments.

FIG. 5 illustrates constraints on model parameters for part models within an object model, in accordance with some embodiments. FIG. 5 illustrates a tabletop part model 500 and table leg part model 510 for a table object model. The table object model may be associated with an assembly graph that requires that the table legs part models be placed in the corners of the table. Thus, the assembly graph may include constraints on the external model parameters of the table legs such that the table legs are located near the corners of the tabletop model 500. Using the example reference point 520 illustrated in FIG. 5 that indicates which corner of the tabletop model 500 is the reference point for the external model parameters of the table leg model 510, the model assembly module 150 may identify constraints on the external model parameters of the table leg model 510 that the table leg model 510 be located at (X+W−d, Y+L1−d, Z+H). The value d is an offset that the assembly graph uses to offset the center of the table legs from the edge of the tabletop. This constraint is based on the table leg model's position being based on the center point of the top surface of the table leg model 510, though other points on the table leg model can be used to determine the table leg model's position, which might cause the constraint's specific values to differ from that described above.

Additionally, the assembly graph may include a constraint that the top radius of the table leg model 510 meet the edge of the table from its offset position. Thus, an additional constraint on the model parameters of the table leg model 510 may be that R=d.

The model assembly module 150 uses an iterative gradient decent process to compute the set of model parameter values for the part models that make up the object model. The model assembly module 150 starts this iterative process with an initial set of model parameter values. This initial set of model parameters values may be initialized by the model assembly module 150 or may be model parameter values from a pre-existing set of part models.

The model assembly module 150 generates 250 a reference image based on the set of model parameters. The model assembly module 150 generates the reference image by rendering an image based an object model from the parts models, where the parts models are structured based on the set of model parameters. The model assembly module 150 also uses a set of camera parameters to generate the reference image. The camera parameters are parameters that determine the perspective from which the reference image is generated. As with the model parameters, the camera parameters can have internal camera parameters and external camera parameters. The internal camera parameters may include parameters like the focal length of the camera. The external parameters can include parameters that set the position or orientation of the camera.

The model assembly module 150 scores 260 the reference image by comparing the reference image to the received 2D image. For example, the model assembly module 150 may score the reference image by measuring an overlap of the object model rendered in the reference image to the object in the 2D image. Other error measures may include a color difference between overlapping pixel points.

The model assembly module 150 updates the model parameters and the camera parameters through a differentiable error function generated based on the model parameters, the camera parameters, and the constraints. The differentiable error function is a differentiable function that generates a score that represents how well the image rendered based on the camera parameters and an object model generated based on the set of model parameters. The differentiable error function is generated for the object model based on the model parameters, the camera parameters, and the constraints. The model assembly module 150 may generate the differentiable error function by, for example, measuring the normalized overlap of the rendered image and a reference image or the Jaccard similarity, or using structural similarity. One example method for generating a differentiable error function is described in Zhou Wang, Alan C. Bovik, Hamid R. Sheikh, and Eero P. Simoncelli, *Image Quality Assessment: From Error Visibility to Structural Similarity*, IEEE Transactions on Image Processing, Vol. 13, No. 4 (April 2004), the contents of which are incorporated by reference. The model assembly module 150 uses the differentiable error function to apply a gradient decent process to update the model parameters and the camera parameters based on the score for the reference image.

The model assembly module 150 iterates 280 through steps 250-270 to update the model parameters and the camera parameters until the score for a reference image exceeds a threshold. The threshold may be set by an operator of the model generation system 120 or may be automatically updated by the model generation system 120. When the score for a reference image exceeds the threshold, the model assembly module 150 stores 290 the current set of model parameters as the final set of model parameters for the parts of the object model.

In some embodiments, the model assembly module 150 generates model parameters based on multiple 2D images of the same object. In these embodiments, the model assembly module 150 generates multiple reference images in each iteration based on multiple sets of camera parameter values and updates the set of model parameter values and the sets of camera parameter based on each of the reference images.

The model assembly module 150 may generate a final object model based on the final set of model parameter values generated based on the process described above. For example, the model assembly module 150 may generate a mesh that represents the object model and may apply a texture to the mesh. The model assembly module 150 may store the final set of model parameter values, the mesh structure of the object model, or the mesh structure with a texture applied to a computer-readable medium.

Example Machine Architecture

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604 and the storage unit 616 communicate via a bus 608.

In addition, the computer system 600 can include a static memory 606, a display driver 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The model generation system improves, among other benefits, on conventional model generation technologies by reusing previously generated part models for a new part corresponding to an object, thereby allowing high-quality 3D models to be generated more easily. Additionally, by using the constraints on the model parameters that reduce the number of free variables, the gradient decent process can be performed more efficiently.

The foregoing description of the embodiments has been presented for the purpose of illustration; it is not intended to be exhaustive or to limit the patent rights to the precise pages disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising one or more computer-readable media containing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to an apparatus for performing the operations herein. This apparatus may be specially constructed for the required purposes, or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The weights may be stored on one or more computer-readable media, and are used by a system when applying the machine-learning model to new data.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C having at least one element in the combination that is true (or present). As a not-limiting example, the condition "A, B, or C" is satisfied by A and B are true (or present) and C is false (or not present). Similarly, as another not-limiting example, the condition "A, B, or C" is satisfied by A is true (or present) and B and C are false (or not present).

What is claimed is:

1. A method for storing a three-dimensional (3D) object model depicting a 3D object, the method comprising:
   receiving a two-dimensional (2D) image depicting an object;
   identifying a set of object parts for the object in the 2D image;
   identifying a part model for each of the identified object parts;
   identifying a set of model parameters for the set of part models, each model parameter corresponding to a parameter that determines a three-dimensional structure of a part model;
   identifying a set of constraints for the set of model parameters, each constraint corresponding to a relationship between two or more model parameters of the set of model parameters that reduces a number of free variables in the set of model parameters;
   generating a set of model parameter values based on the set of model parameters;
   computing a final set of model parameter values by iteratively:
      generating a reference image based on the set of model parameter values and a camera perspective;
      scoring the reference image by applying a differentiable error function to the reference image, the differentiable error function to compare the reference image to the received object image, and the differentiable error function based on the set of model parameters and the set of constraints; and
      updating the set of model parameter values based on the score for the reference image and the differentiable error function by performing a gradient decent process;
   generating an object model based on the final set of model parameter values; and
   storing the object model to the computer-readable medium.

2. The method of claim 1, further comprising:
generating a set of camera parameter values, wherein a camera parameter is a parameter that determines the camera perspective from which the reference image can be generated; and
computing the final set of model parameter values by iteratively:
generating the reference image based on the set of camera parameter values; and
updating the set of camera parameter values based on the differentiable error function and the score for the reference image, wherein the differentiable error function is based on the set of camera parameters.

3. The method of claim 1, further comprising:
receiving a plurality of two-dimensional object images depicting the object; and
computing the final set of model parameter values by iteratively:
generating a reference image for each object image of the plurality of object images;
scoring each reference image by applying the differentiable error function to each reference image; and
updating the set of model parameter values based on the score for each reference image.

4. The method of claim 1, wherein each part model comprises a set of shapes, and wherein the set of model parameters comprises shape parameters for the sets of shapes of each part model.

5. The method of claim 1, wherein identifying the set of object parts for the object comprises applying semantic segmentation to the two-dimensional object image.

6. The method of claim 1, wherein identifying the set of constraints for the set of model parameters comprises identifying an assembly graph associated with an object type of the object.

7. The method of claim 1, wherein generating the reference image comprises:
generating an object model for the object based on the set of model parameter values; and
rendering a two-dimensional image of the object model based on the camera perspective.

8. A non-transitory, computer-readable medium storing instructions that, when executed by a processor, cause the processor to:
receive a two-dimensional (2D) image depicting an object;
identify a set of object parts for the object in the 2D image;
identify a part model for each of the identified object parts;
identify a set of model parameters for the set of part models, each model parameter corresponding to a parameter that determines a three-dimensional structure of a part model;
identify a set of constraints for the set of model parameters, each constraint corresponding to a relationship between two or more model parameters of the set of model parameters that reduces a number of free variables in the set of model parameters;
generate a set of model parameter values based on the set of model parameters;
compute a final set of model parameter values by iteratively:
generate a reference image based on the set of model parameter values and a camera perspective;
score the reference image by applying a differentiable error function to the reference image, the differentiable error function to compare the reference image to the received object image, and the differentiable error function based on the set of model parameters and the set of constraints; and
update the set of model parameter values based on the score for the reference image and the differentiable error function by performing a gradient decent process;
generate an object model based on the final set of model parameter values; and
store the object model to the computer-readable medium.

9. The computer-readable medium of claim 8, wherein the instructions further cause the processor to:
generate a set of camera parameter values, wherein a camera parameter is a parameter that determines the camera perspective from which the reference image can be generated; and
compute the final set of model parameter values by iteratively:
generate the reference image based on the set of camera parameter values; and
update the set of camera parameter values based on the differentiable error function and the score for the reference image, wherein the differentiable error function is based on the set of camera parameters.

10. The computer-readable medium of claim 8, wherein the instructions further cause the processor to:
receiving a plurality of two-dimensional object images depicting the object; and
computing the final set of model parameter values by iteratively:
generating a reference image for each object image of the plurality of object images;
scoring each reference image by applying the differentiable error function to each reference image; and
updating the set of model parameter values based on the score for each reference image.

11. The computer-readable medium of claim 8, wherein each part model comprises a set of shapes, and wherein the set of model parameters comprises shape parameters for the sets of shapes of each part model.

12. The computer-readable medium of claim 8, wherein the instructions for identifying the set of object parts for the object further cause the processor to apply semantic segmentation to the two-dimensional object image.

13. The computer-readable medium of claim 8, wherein the instructions for identifying the set of constraints for the set of model parameters further cause the processor to identify an assembly graph associated with an object type of the object.

14. The computer-readable medium of claim 8, wherein the instructions for generating the reference image further cause the processor to:
generate an object model for the object based on the set of model parameter values; and
render a two-dimensional image of the object model based on the camera perspective.

15. A non-transitory, computer-readable medium storing a three-dimensional (3D) object model depicting a 3D object, wherein the computer-readable medium is produced by a process comprising:
receiving a two-dimensional (2D) image depicting an object;
identifying a set of object parts for the object in the 2D image;
identifying a part model for each of the identified object parts;

identifying a set of model parameters for the set of part models, each model parameter corresponding to a parameter that determines a three-dimensional structure of a part model;
identifying a set of constraints for the set of model parameters, each constraint corresponding to a relationship between two or more model parameters of the set of model parameters that reduces a number of free variables in the set of model parameters;
generating a set of model parameter values based on the set of model parameters;
computing a final set of model parameter values by iteratively:
 generating a reference image based on the set of model parameter values and a camera perspective;
 scoring the reference image by applying a differentiable error function to the reference image, the differentiable error function to compare the reference image to the received object image, and the differentiable error function based on the set of model parameters and the set of constraints; and
 updating the set of model parameter values based on the score for the reference image and the differentiable error function by performing a gradient decent process;
generating an object model based on the final set of model parameter values; and
storing the object model to the computer-readable medium.

16. The computer-readable medium of claim 15, the process further comprising:
 generating a set of camera parameter values, wherein a camera parameter is a parameter that determines the camera perspective from which the reference image can be generated; and
 computing the final set of model parameter values by iteratively:
 generating the reference image based on the set of camera parameter values; and
 updating the set of camera parameter values based on the differentiable error function and the score for the reference image, wherein the differentiable error function is based on the set of camera parameters.

17. The computer-readable medium of claim 15, the process further comprising:
 receiving a plurality of two-dimensional object images depicting the object; and
 computing the final set of model parameter values by iteratively:
 generating a reference image for each object image of the plurality of object images;
 scoring each reference image by applying the differentiable error function to each reference image; and
 updating the set of model parameter values based on the score for each reference image.

18. The computer-readable medium of claim 15, wherein each part model comprises a set of shapes, and wherein the set of model parameters comprises shape parameters for the sets of shapes of each part model.

19. The computer-readable medium of claim 15, wherein identifying the set of object parts for the object comprises applying semantic segmentation to the two-dimensional object image.

20. The computer-readable medium of claim 15, wherein identifying the set of constraints for the set of model parameters comprises identifying an assembly graph associated with an object type of the object.

* * * * *